(12) United States Patent
Hisano et al.

(10) Patent No.: US 10,779,031 B2
(45) Date of Patent: Sep. 15, 2020

(54) VIDEO STICKY NOTES INFORMATION PROCESSING APPARATUS AND NON-TRANSITORY COMPUTER READABLE MEDIUM

(71) Applicant: FUJI XEROX CO., LTD., Tokyo (JP)

(72) Inventors: Tohru Hisano, Yokohama (JP); Kazunori Horikiri, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 225 days.

(21) Appl. No.: 15/244,964

(22) Filed: Aug. 23, 2016

(65) Prior Publication Data

US 2017/0272806 A1    Sep. 21, 2017

(30) Foreign Application Priority Data

Mar. 16, 2016   (JP) .................................. 2016-051844

(51) Int. Cl.
| | | |
|---|---|---|
| *G06F 9/48* | (2006.01) | |
| *H04N 21/431* | (2011.01) | |
| *G06F 3/0484* | (2013.01) | |
| *G06F 40/169* | (2020.01) | |

(52) U.S. Cl.
CPC ....... *H04N 21/4312* (2013.01); *G06F 3/0484* (2013.01); *G06F 40/169* (2020.01)

(58) Field of Classification Search
CPC . H04N 21/4312; G06F 3/0484; G06F 17/241; G06F 40/169
See application file for complete search history.

(56) References Cited

U.S. PATENT DOCUMENTS

| | | | | |
|---|---|---|---|---|
| 10,001,904 B1* | 6/2018 | Geller | ..................... | G11B 27/34 |
| 2004/0059783 A1 | 3/2004 | Kazui et al. | | |
| 2008/0028323 A1* | 1/2008 | Rosen | ..................... | G06Q 10/10 |
| | | | | 715/752 |
| 2010/0083253 A1* | 4/2010 | Kushwaha | ........... | G06Q 10/063 |
| | | | | 718/100 |
| 2013/0132839 A1* | 5/2013 | Berry | ................... | G11B 27/031 |
| | | | | 715/719 |
| 2013/0145269 A1* | 6/2013 | Latulipe | .................. | G06F 3/048 |
| | | | | 715/720 |

(Continued)

FOREIGN PATENT DOCUMENTS

| | | | |
|---|---|---|---|
| JP | 2003-283981 A | 10/2003 | |
| JP | 2004-297245 A | 10/2004 | |

(Continued)

OTHER PUBLICATIONS

Jul. 16, 2019 Office Action issued in Japanese Patent Application No. 2016-051844.

*Primary Examiner* — Jennifer N To
*Assistant Examiner* — K C Chen
(74) *Attorney, Agent, or Firm* — Oliff PLC

(57) ABSTRACT

An information processing apparatus includes a pasting unit that plays a video and pastes at least one sticky note to the video; a removal unit that removes the sticky note pasted by the pasting unit from the video in a case where a predetermined condition is satisfied; and a display unit that displays the sticky note removed by the removal unit on a time axis so that a date and time at which the sticky note removed by the removal unit is pasted to the video is indicated on the time axis so as to be checked.

5 Claims, 13 Drawing Sheets

(56) References Cited

U.S. PATENT DOCUMENTS

| | | | |
|---|---|---|---|
| 2015/0264004 A1* | 9/2015 | Khoo | G06Q 10/107 709/206 |
| 2016/0378734 A1* | 12/2016 | Mullins | G06F 3/04845 715/229 |
| 2017/0013042 A1* | 1/2017 | Hirschfeld | G06Q 50/01 |
| 2017/0110156 A1* | 4/2017 | Markan | G11B 27/34 |
| 2017/0249970 A1* | 8/2017 | Loganathan | G11B 27/031 |

FOREIGN PATENT DOCUMENTS

| | | |
|---|---|---|
| JP | 2004-362452 A | 12/2004 |
| JP | 2008-172745 A | 7/2008 |
| JP | 2009-223505 A | 10/2009 |
| JP | 2014-229167 A | 12/2014 |
| WO | 02/073462 A1 | 9/2002 |

* cited by examiner

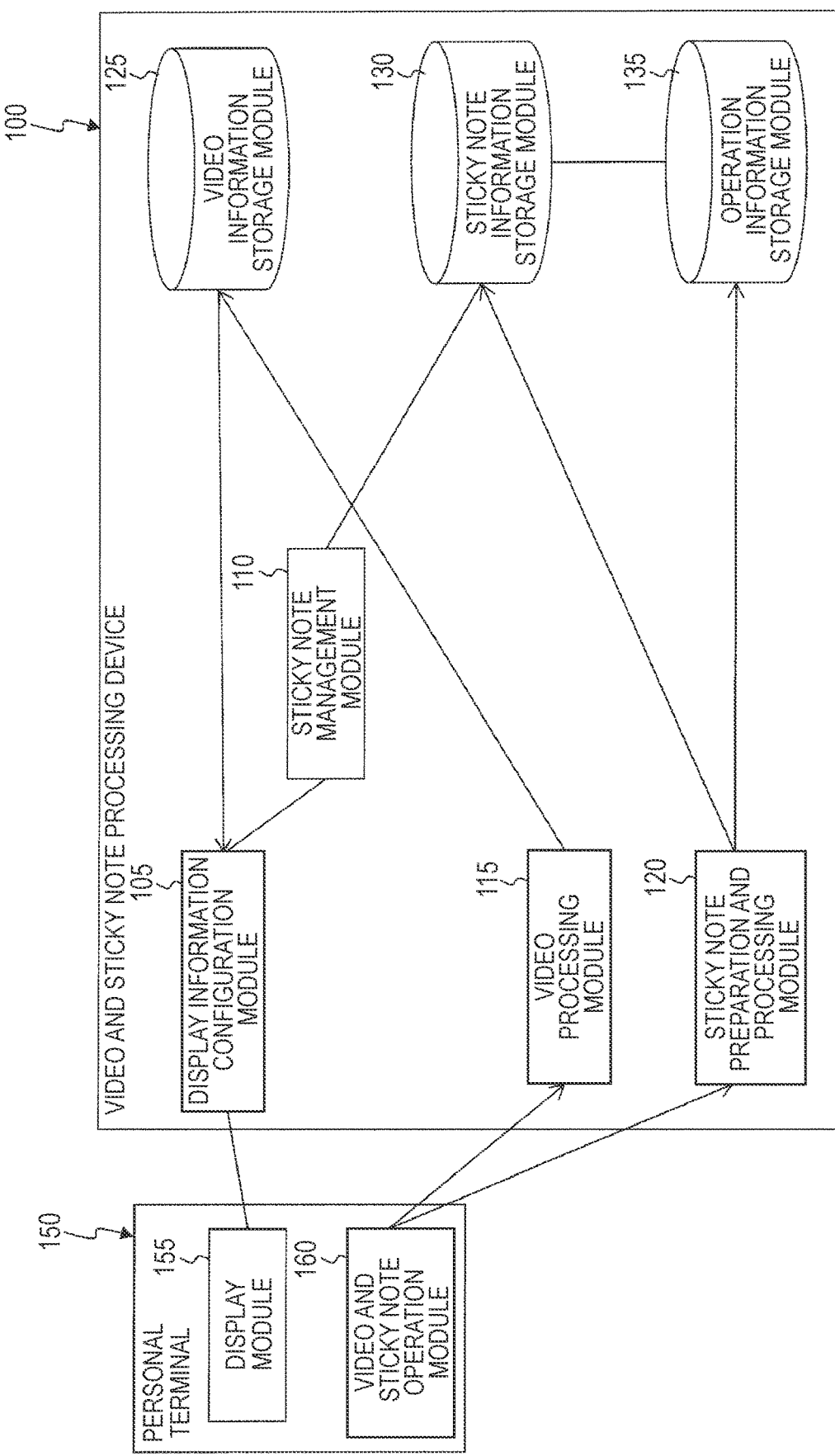

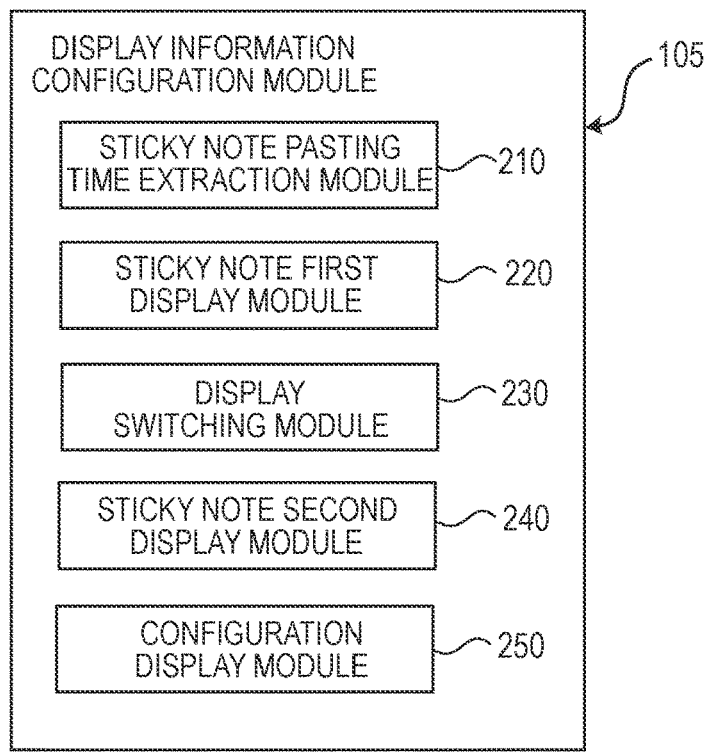
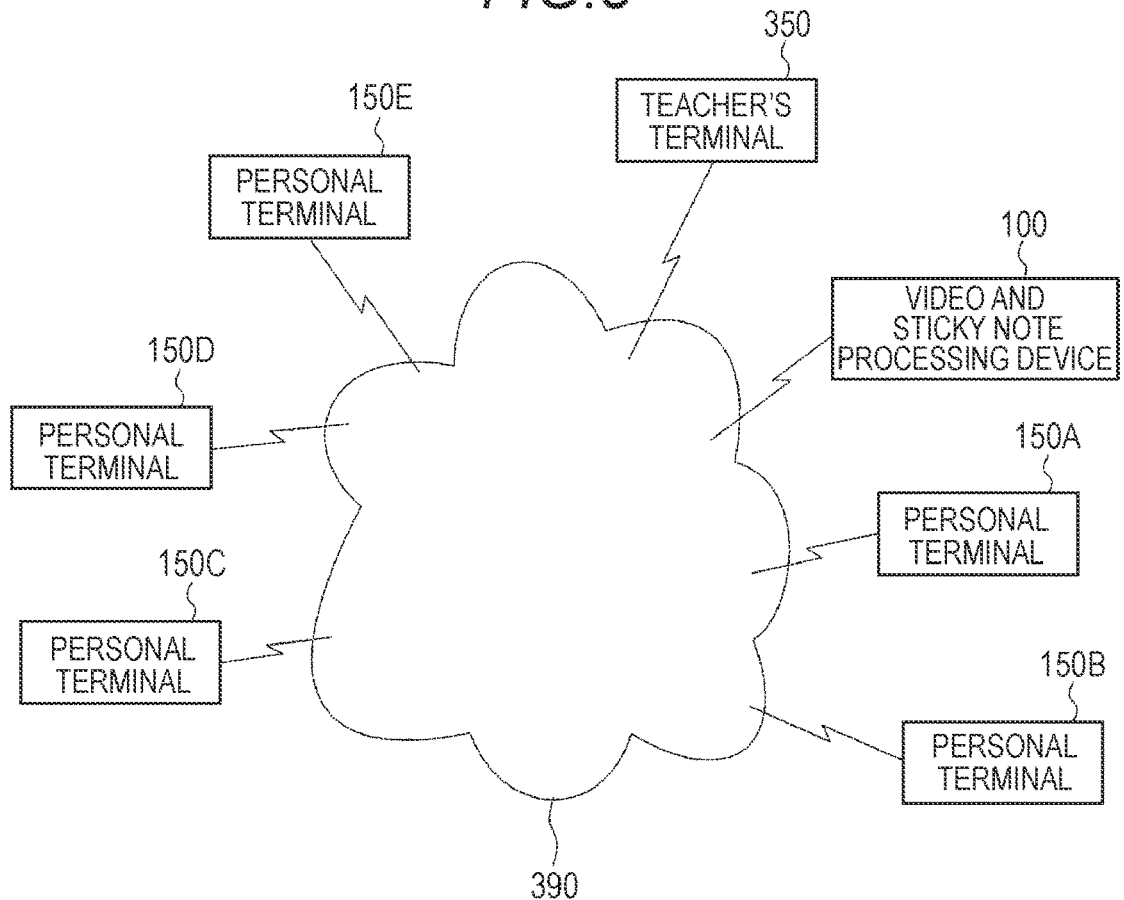

FIG.4

| 405 | 410 | 420 | 430 | | 440 | |
|---|---|---|---|---|---|---|
| | | | FIRST CHAPTER | | SECOND CHAPTER | |
| VIDEO ID | VIDEO NAME | NUMBER OF CHAPTER | STARTING TIME | ENDING TIME | STARTING TIME | ENDING TIME |
| | | | 432 | 434 | 442 | 444 |
| | | | | | | |

| 400 |  |
|---|---|
| ... | |

| 450 | 460 | | | | |
|---|---|---|---|---|---|
| | | | PASTING PROHIBITION AREA | | |
| NUMBER OF PASTING PROHIBITION AREAS | STARTING TIME | ENDING TIME | X-COORDINATE | Y-COORDINATE | WIDTH | HEIGHT |
| | 462 | 464 | 466 | 468 | 470 | 472 |

FIG.5

| 510 | 515 | 520 | 525 | 530 | 535 | 536 | 540 | 545 | 550 | 555 |
|---|---|---|---|---|---|---|---|---|---|---|
| STICKY NOTE ID | PASTING POSITION | SIZE | PREPARATION DATE AND TIME | PREPARER | PASTING DATE AND TIME | ELAPSED TIME IN VIDEO | BEING UPDATED | UPDATER | COLOR | FRAME LINE SHAPE |
| F0001 | (100,200) | (10,5) | | KF | | | | | | |

| 560 | 565 | 570 | 575 | 580 | 585 | 590 | ... | 595 | 597 |
|---|---|---|---|---|---|---|---|---|---|
| FRAME LINE COLOR | FRAME LINE THICKNESS | BELONGING GROUP | NUMBER OF SELECTION TIMES | NUMBER OF CONNECTION STICKY NOTES | CONNECTED STICKY NOTE ID | CONNECTION DIRECTION | ... | TYPE OF CONTENT | CONTENT |
| | | | | | | | | TEXT | |

| LOG ID | TARGET VIDEO ID | USER ID | DATE AND TIME | STICKY NOTE ID | OPERATION CONTENT | ELAPSED TIME IN VIDEO |
|---|---|---|---|---|---|---|
| 705 | 710 | 715 | 720 | 725 | 730 | 735 |

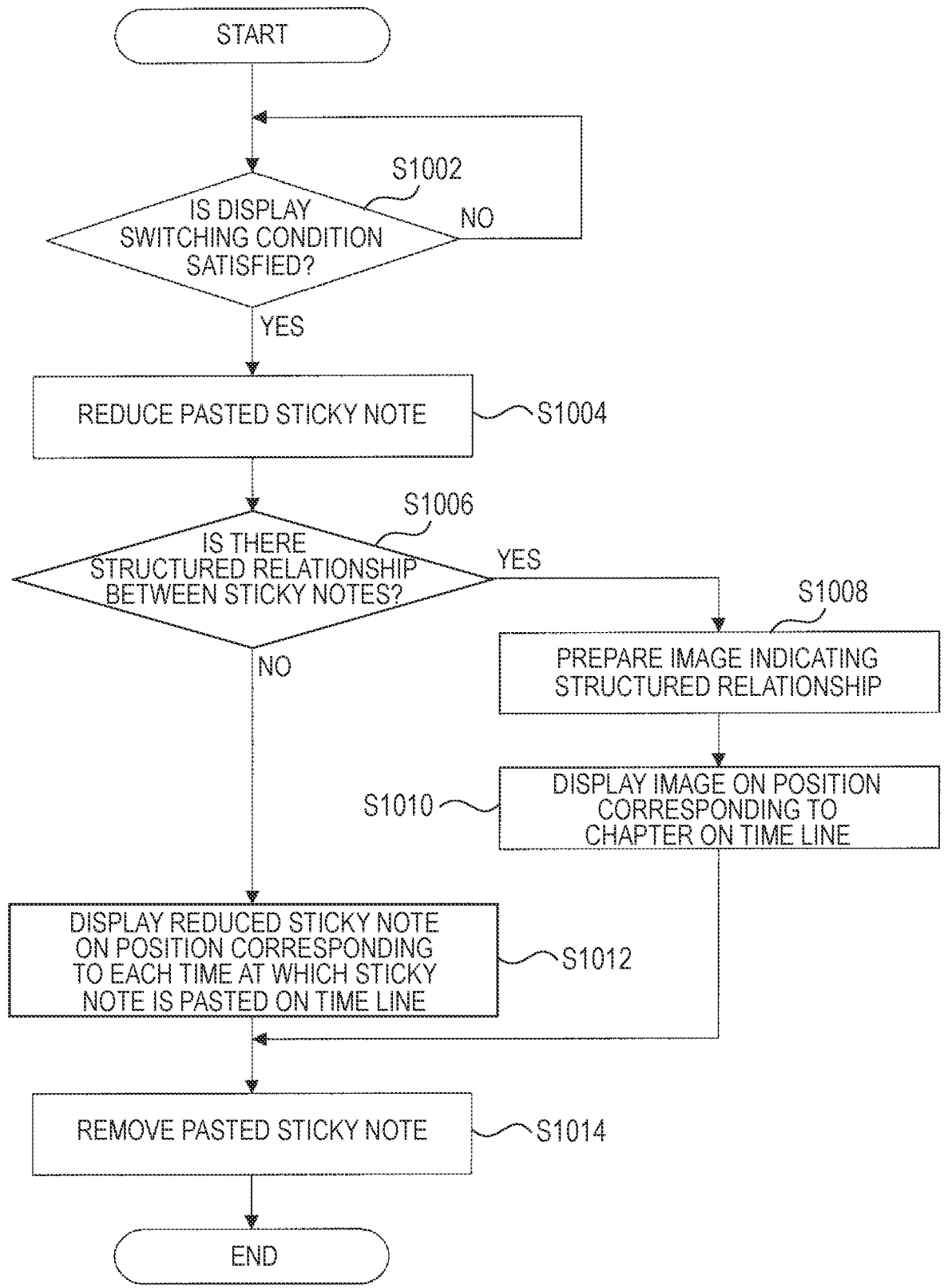

FIG.10A
FIG.10B
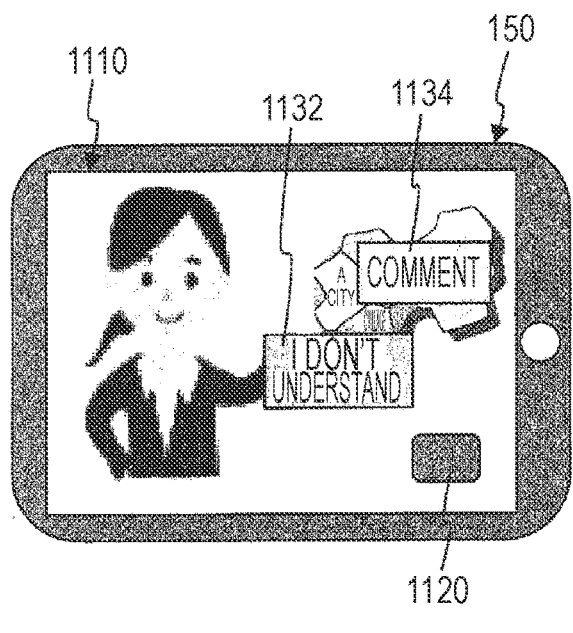
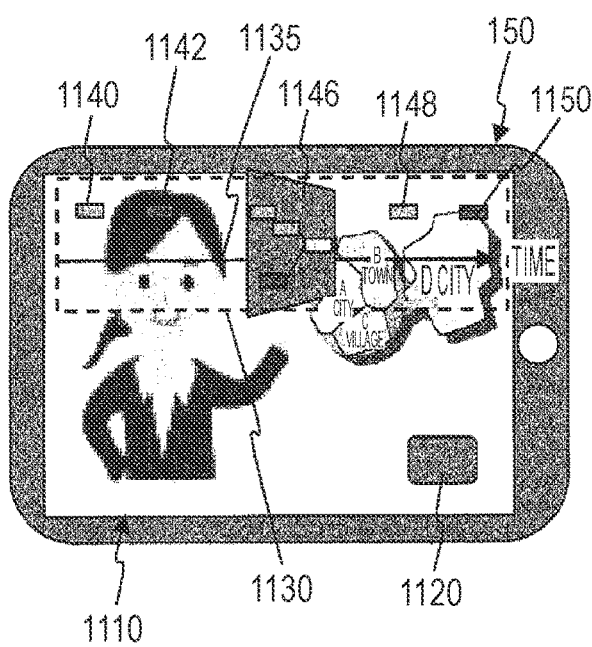

VIDEO STICKY NOTES INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-051844 filed on Mar. 16, 2016.

BACKGROUND

Technical Field

The present invention relates to an information processing apparatus and a non-transitory computer readable medium.

SUMMARY

According to an aspect of the invention, there is provided an information processing apparatus including: an pasting unit that plays a video and pastes at least one sticky note to the video; a removal unit that removes the sticky note pasted by the pasting unit from the video in a case where a predetermined condition is satisfied; and a display unit that displays the sticky note removed by the removal unit on a time axis so that a date and time at which the sticky note removed by the removal unit is pasted to the video is indicated on the time axis so as to be checked.

BRIEF DESCRIPTION OF DRAWINGS

Exemplary embodiments of the present invention will be described in detail based on the following figures, wherein:

FIG. 1 is a configuration diagram conceptually illustrating modules in a configuration example of an exemplary embodiment;

FIG. 2 is another configuration diagram conceptually illustrating modules in a configuration example of the exemplary embodiment;

FIG. 3 is an explanatory diagram illustrating a configuration example of a system using the exemplary embodiment;

FIG. 4 is an explanatory diagram illustrating an example of a data structure of a video information table;

FIG. 5 is an explanatory diagram illustrating an example of a data structure of a sticky note information table;

FIG. 6 is an explanatory diagram illustrating an example of a data structure of an operation log table;

FIG. 9 is a flowchart illustrating an example of another process performed by the exemplary embodiment;

FIGS. 10A and 10B are explanatory diagrams illustrating an example of processing performed by the exemplary embodiment;

DETAILED DESCRIPTION

Figure 7:
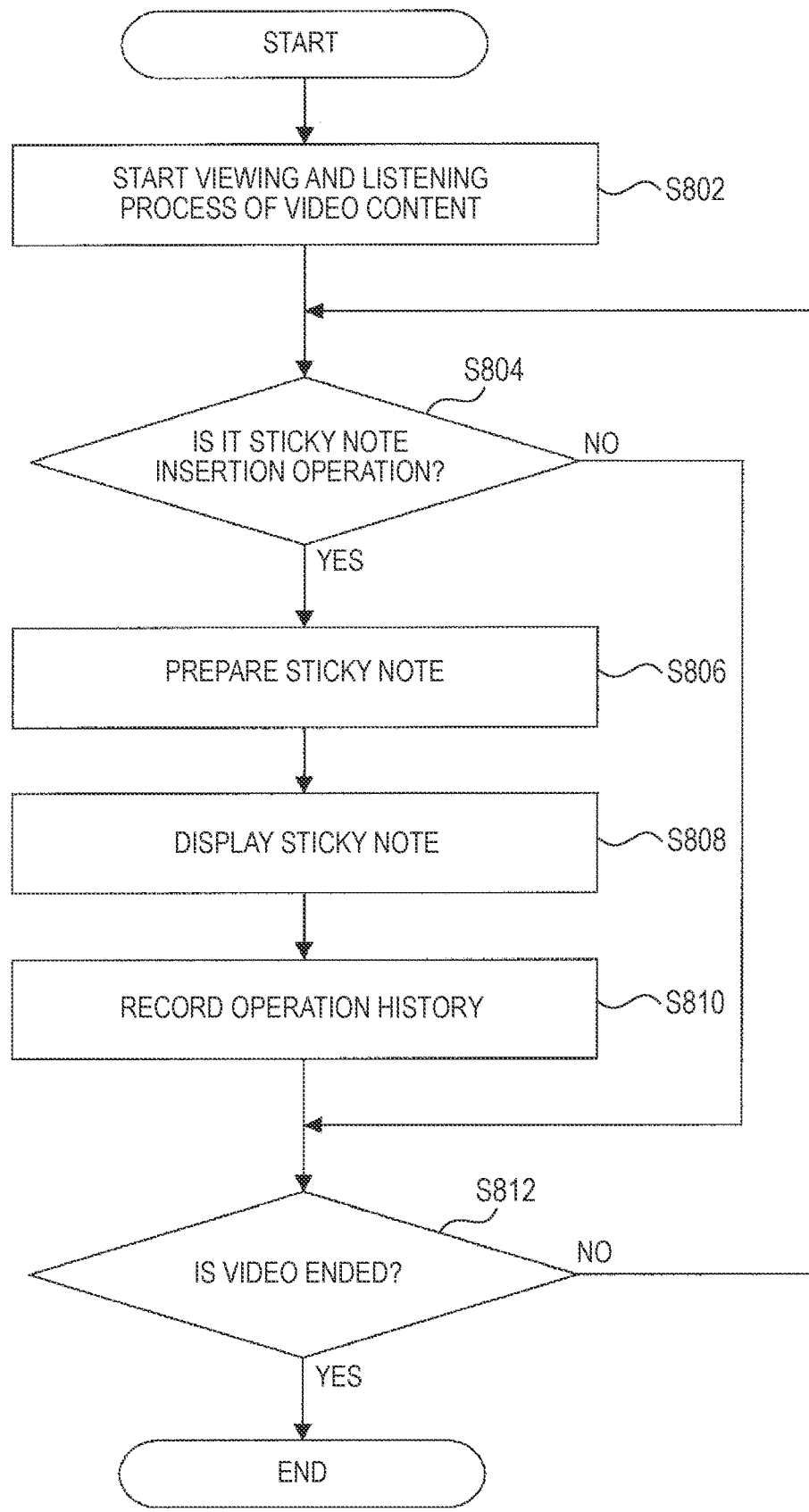
FIG. 7 is a flowchart illustrating an example of a process performed by the exemplary embodiment.

Hereinafter, examples of preferable exemplary embodiments in implementing the present invention will be described based on the drawings.

FIG. 1 is a configuration diagram conceptually illustrating modules in a configuration example of the present exemplary embodiment.

A module generally refers to logically divisible pieces of software (a computer program) or hardware or the like. Accordingly, the module in the present exemplary embodiment refers not only to a module in a computer program but also to a module in a hardware configuration. Therefore, in the present exemplary embodiment, a computer program that functions as the modules (a program for causing a computer to execute respective procedures, a program for causing a computer to function as respective units, a program for causing a computer to implement respective functions), a system, and a method are also described. For the convenience of explanation, the expressions of "stores", "is stored", and other expressions equivalent to the expressions are used. However, in a case where an exemplary embodiment is a computer program, these expressions mean that something is caused to be stored in a storage device or control is performed such that something is stored in the storage device. The module may have a one-to-one correspondence with a function. However, in mounting the modules, a single module may include a single program, plural modules may include a single program, and in an opposite manner, a single module may include plural programs. Furthermore, plural modules may be executed by a single computer or a single module may be executed by plural computers in a distributed or parallel environment. Other modules may be included in a single module. In the following, the expression "connection" is also used in a case of a logical connection (sending and receiving of data, issuing of instructions, reference relationship between data, or the like) in addition to a physical connection. The expression "predetermined" is used to include the meaning that matters are determined before processing regarded as a target is performed, and matters are determined based on the situation and the state at that time or determined based on the situation and the state until that time before the processing regarded as the target is performed even after the processing in the present exemplary is started as well as before the processing in the present exemplary embodiment is started. In a case where there are plural "predetermined values", the predetermined values may be respectively different values or two or more (also including all the values) of the predetermined values may be the same. The description signifying that "In a case of A, it is regarded as B" is used to signify that "It is determined whether it is A, and when it is determined that it is A, it is regarded as B". However, a case where the determination as to whether it is A is unnecessary is excluded.

A system or an apparatus is configured in such a way that plural computers, hardware, apparatuses or the like are connected to each other by a communication unit such as a network (including communication connection on one-to-one correspondence), and may be implemented by a single computer, hardware, apparatus or the like. The "apparatus" and the "system" are interchangeably used herein as having the same meaning. The "system" does not include a social "mechanism" (a social system) that is merely an artificial arrangement.

A piece of information regarded as a target is read from the storage device for each processing by each module or for each processing in a case where plural processing is performed in the module and a processing result is written into the storage device after the processing is performed. Accordingly, description of the reading from the storage device before the processing and the writing into the storage device after the processing may be omitted. Here, the storage device may include a hard disk, a random access memory (RAM), an external storage medium, a storage device through a communication line, a register within a central processing unit (CPU) or the like.

An information processing system of the present exemplary embodiment that pastes a sticky note on a video, as illustrated in the example of FIG. 1, includes a video and sticky note processing device 100 and a personal terminal 150.

Text may be pasted to a video. For example, education using the video is conducted. The video is used particularly for a flipped classroom. In the flipped classroom, regarding new learning contents, the students normally watch a video class (videos) at home or the like for preparation and lectures are not conducted in the classroom. To the contrary, regarding an assignment that is conventionally given as homework, a class is conducted in such a way that the teacher instructs respective students according to individual abilities or that the students engage in the class actively in cooperation with other students. In such class, the teacher serves as a facilitator.

Specifically, the following are conducted in the exemplary embodiment, for an example:

(1) A student watches teaching materials (videos) for preparation distributed from a teacher at home.
(2) A student pastes a point/notice/question/consideration memo as a sticky note while viewing the video. The memo pasted as the sticky note after the video is re-viewed is displayed with the number of re-view/in an enlarged size of the sticky note.
(3) Displaying of the memo continues for a predetermined time from the time at which the sticky note is pasted (an elapsed time in the video for which sticky note pasting operation is performed). Later, an image pasted with the sticky note is viewed when viewing the video. The sticky note is shared within a group permitted.

Here, the "elapsed time in the video" indicates an elapsed time within the video. The "elapsed time" indicates a time at which a reproduction operation is performed in a case where the video is played at a normal speed at the beginning. Accordingly, the "elapsed time in the video" does not indicate a real date and time but indicates a temporal position of the video. For example, a value of the "elapsed time in the video" is not affected even when processing such as stopping or fast forwarding is performed.

(4) A swim lane chart (which will be described later using FIG. 13 and FIG. 14) in which questions are arranged in order is generated along a time line of a video. Teaching by the flipped classroom is conducted in a case where there is a student who is able to understand lectures. In a case where a lot of students are not able to understand, the teacher supports the students. A chapter number, thumbnail or the like may be displayed to cause the student to intuitively understand at which position the sticky note is placed. When the sticky note is selected, displaying may be returned to play the video.
(5) Even before the flipped classroom, an attitude for preparation of a student, whose understanding improvement loop is turned from a question to a hint, a consideration to improvement, may be regarded as being improved. The teacher is able to grasp a quality of preparation by a structure of the sticky note (which will be described later using an example of FIG. 14).
(6) The sticky note pasted on video teaching materials is developed in a two dimensional mount (which will be described later using an example of FIG. 15). The sticky note of the point, the notice, or the consideration is also used in examining materials for group work as it is.

The personal terminal 150 includes a display module 155 and a video and sticky note operation module 160. The personal terminal 150 is a personal computer (PC) (including a notebook PC, a tablet type PC, or the like) capable of being communicated with the video and sticky note processing device 100. The video is played (displayed) on a display device such as a liquid crystal display provided in the personal terminal 150. The video may contain voice in addition to an image and the voice is output through a speaker provided in the personal terminal 150. The contents of the video include, but are not limited to, for example, teaching materials for education as described above. Specifically, slide teaching materials with voice for preparation that is prepared by a teacher correspond to the teaching materials for education.

The display module 155 is connected with a display information configuration module 105 of the video and sticky note processing device 100. The display module 155 displays the video, the sticky note pasted on the video, or the like in the display device of the personal terminal 150 according to the processing by the display information configuration module 105 of the video and sticky note processing device 100.

A video and sticky note operation module 160 is connected with a video processing module 115 and a sticky note preparation and processing module 120 of the video and sticky note processing device 100. The video and sticky note operation module 160 receives an operation by the user, for example, an operation to the video displayed in the display device (for example, stopping, fast forwarding reproduction, rewinding reproduction, or the like) or an operation to the sticky note (for example, preparation, pasting, removal, change or the like, of the sticky note) and passes the operation to the video and sticky note processing device 100.

The video and sticky note processing device 100 includes the display information configuration module 105, the sticky note management module 110, a video processing module 115, the sticky note preparation and processing module 120, a video information storage module 125, a sticky note information storage module 130, and an operation information storage module 135. The video and sticky note processing device 100 is communicable with the personal terminal 150 and performs control of the distribution of the videos and the display of the sticky note, or the like.

The display information configuration module 105 is connected with the sticky note management module 110, the video information storage module 125, and the display module 155 of the personal terminal 150. The display information configuration module 105 generates a piece of information for controlling the display of the video, the sticky note, or the like for the personal terminal 150. The display information configuration module 105 displays the video so as to be capable of being played. The processing relating to the sticky note and to be performed by the display information configuration module 105 will be described later using the example illustrated in FIG. 2.

The sticky note management module 110 is connected with the display information configuration module 105 and the sticky note information storage module 130. The sticky note management module 110 manages a sticky note and a mount within the sticky note information storage module 130 and provides a piece of information relating to the sticky note and the mount to the display information configuration module 105.

The sticky note management module 110 performs processing for associating the sticky notes with each other according to the operation of the personal terminal 150 by the user. The "processing for associating" includes, for example, connecting the sticky notes with each other, grouping of the sticky notes, or the like. A type of connection indicates a relationship (the relationship is determined in advance) between plural sticky notes, and includes, for example, advice for a question, a hint for a question, improvement for a consideration, or the like.

The video processing module 115 is connected with the video information storage module 125 and the video and sticky note operation module 160 of the personal terminal 150.

The video processing module 115 receives the operation for the video by the user from the personal terminal 150 and performs processing according to the operation. For example, as described above, the video processing module 115 performs the processing such as stopping, fast forwarding reproduction, rewind reproduction, or the like according to the operation.

The sticky note preparation and processing module 120 is connected with the sticky note information storage module 130, the operation information storage module 135, and the video and sticky note operation module 160 of the personal terminal 150. The sticky note preparation and processing module 120 receives the operation to the sticky note by the user from the personal terminal 150 and performs processing according to the operation. For example, as described above, the sticky note preparation and processing module 120 performs the processing such as preparing the sticky note, pasting the sticky note on the video, removing the sticky note, changing the sticky note, or the like. The operation (processing) is stored in the operation information storage module 135 as a history.

The video information storage module 125 is connected with the display information configuration module 105 and the video processing module 115. The video information storage module 125 stores the video and a piece of information relating to reproduction of the video. For example, the video information storage module 125 stores a video information table 400. FIG. 4 is an explanatory diagram illustrating an example of a data structure of the video information table 400. The video information table 400 includes a video ID field 405, a video name field 410, the number of chapter field 420, a first chapter field 430, a second chapter field 440, the number of pasting prohibition areas field 450, and a pasting prohibition area field 460. The first chapter field 430 includes a starting time field 432 and an ending time field 434. The second chapter field 440 includes a starting time field 442 and an ending time field 444. The pasting prohibition area field 460 includes a starting time field 462, an ending time field 464, an X-coordinate field 466, a Y-coordinate field 468, a width field 470, and a height field 472. In the exemplary embodiment, a piece of information (a video ID (identification)) for uniquely identifying the video is stored in the video ID field 405. A name of the video is stored in the video name field 410. The number of chapters (number of first chapter fields 430 or the like) included in the video is stored in the number of chapter field 420. The first chapter is stored in the first chapter field 430. A starting time of the first chapter is stored in the starting time field 432. An ending time of the first chapter is stored in the ending time field 434. The second chapter is stored in the second chapter field 440. A starting time of the second chapter is stored in the starting time field 442. An ending time of the second chapter is stored in the ending time field 444. Here, the "starting time" indicates a time at which the chapter is started in a case where the video is played at a normal speed at the beginning. The "ending time" indicates a time at which the chapter is ended in a case where the video is played at a normal speed at the beginning. Accordingly, the "elapsed time in the video" does not indicate a real date and time but indicates a temporal position of the video. For example, a value of the "elapsed time in the video" is not affected even when processing such as stopping or fast forwarding is performed. The number of areas where pasting of the sticky note is prohibited (number of pasting prohibition area fields 460) is stored in the number of pasting prohibition areas field 450. An pasting prohibition area is stored in the pasting prohibition area field 460. A starting time of the pasting prohibition area is stored in the starting time field 462. An ending time of the pasting prohibition area is stored in the ending time field 464. The upper-left X-coordinate of the pasting prohibition area is stored in the X-coordinate field 466. The upper-left Y-coordinate of the pasting prohibition area (a rectangular shape in this example) is stored in the Y-coordinate field 468. A width of the pasting prohibition area is stored in the width field 470. A height of the pasting prohibition area is stored in the height field 472. The "starting time" in the starting time field 462 and the "ending time" in the ending time field 464 are similar to the "starting time" in the starting time field 432 and the "ending time" in the ending time field 434, respectively. That is, pasting of the sticky note is prohibited in a range (a temporal range spanning from the starting time to the ending time and a planar range designated by the XY-coordinates, a width, and a height) indicated in the pasting prohibition area field 460. For example, displaying of an indication that the sticky note is not allowed to be pasted in the temporal range and the planar range, or the like is performed.

The sticky note information storage module 130 is connected with the sticky note management module 110, the sticky note preparation and processing module 120, and the operation information storage module 135. Pieces of information (including, for example, a piece of attribute information) relating to the sticky note and the video are stored in the sticky note information storage module 130. For example, a sticky note information table 500 is stored in the sticky note information storage module 130. FIG. 5 is an explanatory diagram illustrating an example of a data structure of the sticky note information table 500. The sticky note information table 500 includes a sticky note ID field 510, an pasting position field 515, a size field 520, a preparation date and time field 525, a preparer field 530, an pasting date and time field 535, an elapsed time in video field 536, a being updated field 540, an updater field 545, a color field 550, a frame line shape field 555, a frame line color field 560, a frame line thickness field 565, a belonging group field 570, the number of selection times field 575, the number of connection sticky notes field 580, a connected sticky note ID field 585, a connection direction field 590, a type of content field 595, and a content field 597. In the exemplary embodiment, a piece of information (sticky note ID) for uniquely identifying the sticky note is stored in the sticky note ID field 510. A position where the sticky note is pasted is stored in the pasting position field 515. That is, a position on a screen of the videos is stored in the pasting position field 515. The position is, for example, the coordinates in the XY-coordinate system of the screen of videos. Specifically, the position is specified by movement processing performed by the sticky note operation processing module 115. A size of the sticky note is stored in the size field 520. For example, in a case where the sticky note intended to be displayed has a rectangular shape, the width and height of the sticky note is stored in the size field 520. A date and time at which the sticky note is prepared (year, month, day, time, minute, second, smaller unit than a second, or a combination thereof) are stored in the preparation date and time field 525. A preparer (preparer ID) of the sticky note is stored in the preparer field 530. Otherwise, an information processing apparatus by which the sticky note is prepared (a device ID of the personal terminal 150 or the video and sticky note processing device 100) may be stored in the preparer field 530. A date and time at which the sticky note is pasted on the screen of videos is stored in the pasting date and time field 535. The elapsed time in the video during which the sticky note is pasted on the screen of videos is stored in the elapsed time in video field 536. A piece of information (flag) indicating whether the sticky note is being updated or not is stored in the being updated field 540. The updater (user ID) who performs an update is stored in the updater field 545. The updater may be either a single person or persons. A display color of the sticky note is stored in the color field 550. The display color includes, for example, a color indicating that the sticky note is being updated. A frame line shape (a solid line, a dotted line, a broken line, a wavy line, double lines) in displaying the sticky note is stored in the frame line shape field 555. The frame line shape includes, for example, a frame line shape indicating that the sticky note is being updated. A frame line color in displaying the sticky note is stored in the frame line color field 560. The frame line color includes, for example, a color indicating that the sticky note is being updated. A frame line thickness in displaying the sticky note is stored in the frame line thickness field 565. The frame line thickness includes, for example, a frame line thickness indicating that the sticky note is being updated. A piece of information relating to a group to which the sticky note belongs is stored in the belonging group field 570. For example, a piece of information, which indicates whether the sticky note belongs to a group or not, may be stored in the belonging group field 570. In a case where the sticky note belongs to the group, a group ID, an ID of another sticky note which belongs to the group, or the like may be stored in the belonging group field 570. The number of selected times of the sticky note is stored in the number of selection times field 575. The number of selected times may include, for example, the number of selected times by a topic selecting operation. The number of sticky notes connected to the selected sticky note is stored in the number of connection sticky notes field 580. The next connected sticky note ID field 585 and the next connection direction field 590 may be repeated by the number of connected sticky notes. A sticky note ID of a sticky note connected to the selected sticky note is stored in the connected sticky note ID field 585. The connected sticky note ID is used for extracting, for example, a second sticky note related to a sticky note regarded as a target. A connection direction of the sticky note of the connection direction field 590 and the sticky note of the immediately preceding connected sticky note ID field 585 is stored in the connection direction field 590. The connection direction may be either a piece of information indicating that the sticky note (or the sticky note of the immediately preceding connected sticky note ID field 585) is located at an upstream (connection source)/downstream (connection destination) side or the sticky note ID of the sticky note located at an upstream (or downstream) side. In a case of non-directional connection, the connection direction field 590 may be empty (NULL) and may be made unnecessary. The connection direction indicates, for example, a positional relationship between the sticky note regarded as a target and a second target related to the target. In a case where the second target moves, the second target is moved while maintaining the positional relationship. A type of the content of the sticky note (text information, vector data indicating handwritten characters, figures or the like, voice information, information of a still image such as a photograph, information of a video, or information indicating a combination thereof) is stored in the type of content field 595. The content written into the sticky note is stored in the content field 597. In a state where the sticky note is not pasted on the mount or the screen of the videos, the pasting position field 515 may be empty (NULL) and may contain a predetermined value (default value).

The operation information storage module 135 is connected with the sticky note preparation and processing module 120 and the sticky note information storage module 130. The operation information storage module 135 stores the operation for the sticky note pasted on the video. For example, the operation information storage module 135 stores an operation log table 700. FIG. 6 is an explanatory diagram illustrating an example of a data structure of the operation log table 700. The operation log table 700 includes a log ID field 705, a target video ID field 710, a user ID field 715, a date and time field 720, a sticky note ID field 725, an operation content field 730, and an elapsed time in video field 735. In the exemplary embodiment, a piece of information (log ID) for uniquely identifying the log (history) is stored in the log ID field 705. In the exemplary embodiment, a piece of information (ID of a target video) for uniquely identifying the target video is stored in the target video ID field 710. In the exemplary embodiment, a piece of information (user ID) for uniquely identifying the user is stored in the user ID field 715. A date and time at which an operation is performed is stored in the date and time field 720. A sticky note ID of a sticky note regarded as a target of the operation is stored in the sticky note ID field 725. The content of the operation for the sticky note is stored in the operation content field 730. An elapsed time in the video during which an operation to the sticky note is performed is stored in the elapsed time in video field 735.

The type of operation and the content of operation are stored in the operation content field 730. For example, in a case where a "movement" is a type of operation, a position (XY-coordinates of the center of a sticky note) of a movement source and a position (XY-coordinates of the center of the sticky note) of a movement destination as the content of operation are stored in operation content field 730.

FIG. 2 is another configuration diagram conceptually illustrating modules in a configuration example of the exemplary embodiment.

The display information configuration module 105 includes a sticky note pasting time extraction module 210, a sticky note first display module 220, a display switching module 230, a sticky note second display module 240, and a configuration display module 250.

The sticky note pasting time extraction module 210 extracts a date and time at which the sticky note is pasted. Here, the date and time to be extracted are both the real date and time and the elapsed time of the video. Specifically, the date and time and the elapsed time may be extracted from the pasting date and time field 535 of the sticky note information table 500 and the elapsed time in video field 735 of the operation log table 700.

The sticky note first display module 220 displays the sticky note pasted on the video. Here, a sticky note is displayed with a normal size in the displaying by the sticky note first display module 220. The normal size of the sticky note is the same as that of the sticky note at the time of preparation. The "sticky note pasted on the video" corresponds to a sticky note being displayed on the video on a display. The sticky note may be displayed in translucency (so that the video placed below is seen).

The sticky note first display module 220 may display the number of times of re-viewing regarding the sticky note pasted after the user reviews the video (after the number of reproduction times of a played portion of the video reaches plural times). The size of the sticky note may be increased.

In a case where a predetermined condition is satisfied, the display switching module 230 controls such that the pasted sticky note is removed from the video and the video is displayed by the sticky note second display module 240 or the configuration display module 250.

Here, the "predetermined condition" (switching condition) includes the following conditions:
(1) An elapse of a predetermined time after pasting is performed.
(2) A case where a predetermined segment within the video is encountered after pasting is performed; here, the "predetermined segment" is something like a chapter, for example, corresponds to a chapter.
(3) A case where the number of pasted sticky notes exceeds a predetermined number or is greater than or equal to the predetermined number.
(4) A combination of two or more conditions of condition (1) to condition (3). Here, the combination includes a logical operation. For example, in a case where the logical operation is a logical product (AND), when all of plural conditions are satisfied, a sticky note is removed. In a case of a logical sum (OR), when any of plural conditions is satisfied, a sticky note is removed. Accordingly, when any of plural conditions is satisfied earliest, a sticky note related to the condition satisfied earliest is removed.

The sticky note second display module 240 displays the removed sticky note so as to be checked on a time axis indicating a date and time at which the sticky note is pasted on the video. A specific example of the "displaying of the sticky note so as to be checked on the time axis" will be described later using an example illustrated in FIGS. 11A and 11B.

In a case where an association between the removed sticky notes is performed, the configuration display module 250 may display an image indicating that the sticky notes are associated with each other on the time axis. A specific example of the "image indicating that the sticky notes are associated with each other" will be described later using an example illustrated in FIG. 12B.

FIG. 3 is an explanatory diagram illustrating a configuration example of a system using the exemplary embodiment.

The video and sticky note processing device 100, a personal terminal 150A, a personal terminal 150B, a personal terminal 150C, a personal terminal 150D, a personal terminal 150E, and a teacher's terminal 350 are connected with each other through a communication line 390. The communication line 390 may be a wired communication network, a wireless communication network, or a combination of the wired communication network and the wireless communication network, and may be, for example, the Internet and the Ethernet as a communication infrastructure. The function by the video and sticky note processing device 100 may be implemented as a cloud service.

Each personal terminal 150 plays the video within the video and sticky note processing device 100 and pastes the sticky note on the video according to the operation by each user. The sticky note pasted by other person may be displayed. Here, the other person may be other users who belong to the same group.

There may exist a teacher's terminal 350 which is used by a user (for example, the teacher or the like) who is different from a general user (for example, the student or the like). The teacher's terminal 350 is equipped with the same function as that of the personal terminal 150, but may further display, for example, an image illustrated in the examples of FIG. 13 and FIG. 14 that will be described later.

FIG. 7 is a flowchart illustrating an example of a process performed by the exemplary embodiment.

In Step S802, the display information configuration module 105 of the video and sticky note processing device 100 starts a viewing and listening process of the video content.

In Step S804, the video and sticky note operation module 160 of the personal terminal 150 determines whether it is a sticky note insertion operation or not. In a case where it is the sticky note insertion operation, the process proceeds to Step S806 and otherwise, the process proceeds to Step S812. For example, as will be describe later, detecting if a sticky note insertion button 1120 is pressed may be used for determining the sticky note insertion operation.

In Step S806, the video and sticky note operation module 160 of the personal terminal 150 prepares a sticky note according to an operation of the user.

In Step S808, the display information configuration module 105 (first sticky note display module 220) of the video and sticky note processing device 100 displays the sticky note.

In Step S810, the sticky note preparation and processing module 120 of the video and sticky note processing device 100 records an operation history.

In Step S812, the display information configuration module 105 of the video and sticky note processing device 100 determines whether the video is ended or not. In a case where the video is ended, the process is ended and otherwise, the process returns to Step S804.

Figure 8:
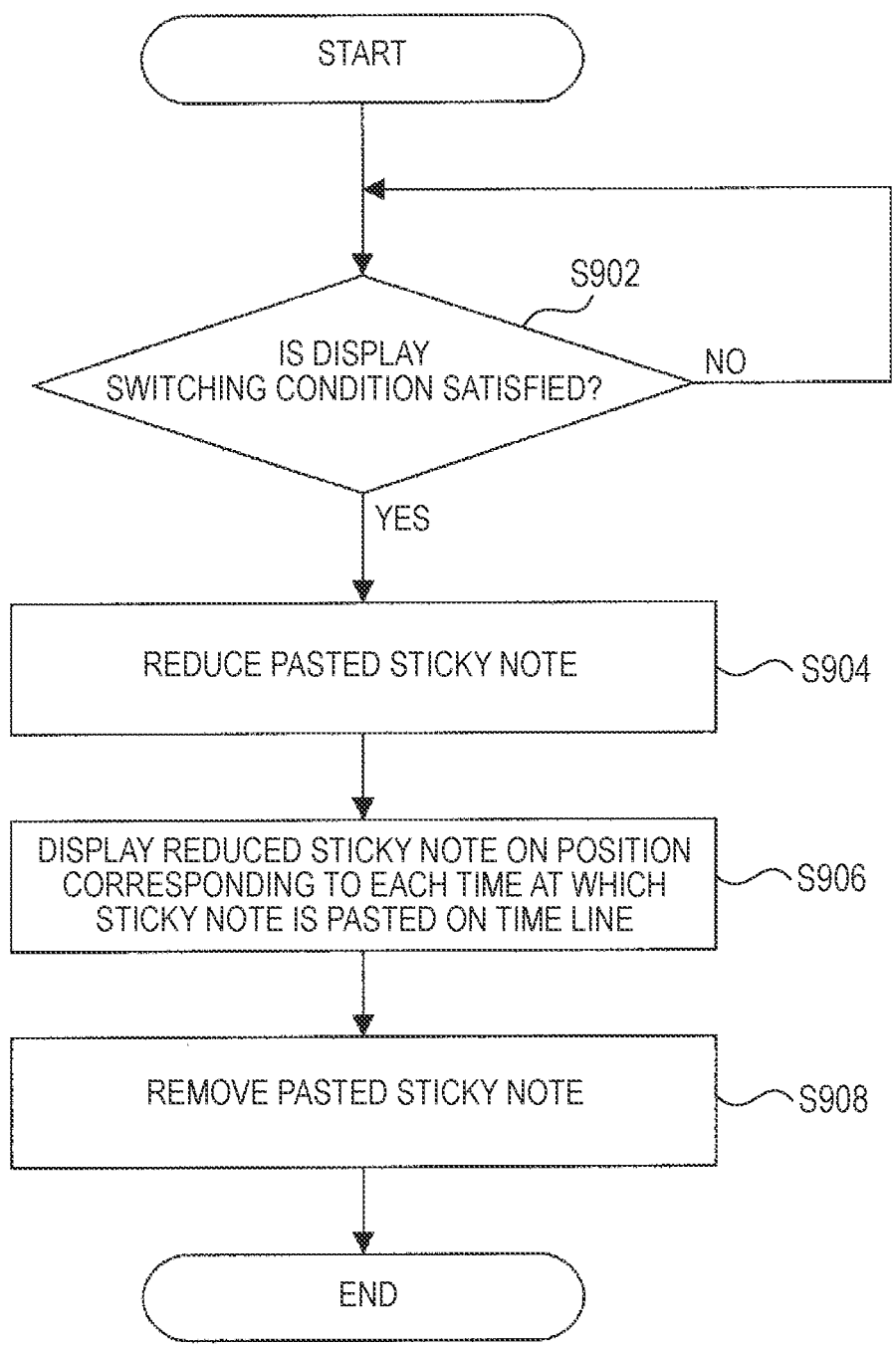
FIG. 8 is a flowchart illustrating an example of another process performed by the exemplary embodiment.

FIG. 8 is a flowchart illustrating an example of another process performed by the exemplary embodiment.

In Step S902, the sticky note pasting time extraction module 210 determines whether a display switching condition is satisfied or not. In a case where the condition is satisfied, the process proceeds to Step S904 and otherwise, the process stands by until the condition is satisfied.

In Step S904, the sticky note second display module 240 reduces a pasted sticky note.

In Step S906, the sticky note second display module 240 displays the reduced sticky note on a position corresponding to each time at which the sticky note is pasted on a time line.

In Step S908, the sticky note pasting time extraction module 210 removes the pasted sticky note.

FIG. 9 is a flowchart illustrating an example of another process performed by the exemplary embodiment. The flowchart of FIG. 9 is obtained by adding Step S1006 to Step S1010 to the flowchart illustrated in the example of FIG. 8.

In Step S1002, the sticky note pasting time extraction module 210 determines whether a display switching condition is satisfied or not. In a case where the condition is satisfied, the process proceeds to Step S1004 and otherwise, the process stands by until the condition is satisfied.

In Step S1004, the sticky note second display module 240 reduces an pasted sticky note.

In Step S1006, the display switching module 230 determines whether there is a structured relationship between the sticky notes or not. In a case where there is the structured relationship between the sticky notes, the process proceeds to Step S1008 and otherwise, the process proceeds to Step S1012.

In Step S1008, the configuration display module 250 prepares an image indicating the structured relationship.

In Step S1010, the configuration display module 250 displays the image on a position corresponding to the chapter included in the video on the time line.

In Step S1012, the sticky note second display module 240 displays the reduced sticky note on a position corresponding to each time at which the sticky note is pasted on the time line.

In Step S1014, the sticky note pasting time extraction module 210 removes the pasted sticky note.

FIGS. 10A and 10B are explanatory diagrams illustrating an example of processing performed by the exemplary embodiment.

An example of FIG. 10A illustrates an example of processing in line with the flowchart illustrated in the example of FIG. 7. In FIG. 10A, it is illustrated that a video is played in a screen 1110 of the personal terminal 150, a sticky note 1132 or the like is prepared after the sticky note insertion button 1120 is pressed down through an operation by the user, and the sticky note 1132 or the like is displayed.

An example of FIG. 10B illustrates an example of processing in line with the flowchart illustrated in the example of FIG. 9. In FIG. 10B, it is illustrated that a time line area 1130 is displayed under the condition that the reproduction of video is changed from the first chapter to the second chapter. In the time line area 1130, the time axis 1135 is displayed and a reduced sticky note 1140, a reduced sticky note 1142, an image displaying a structured sticky note display image 1146, a reduced sticky note 1148, and a reduced sticky note 1150 are displayed on a position indicating a date and time at which the sticky note is pasted. The reduced sticky note 1140 or the like may be a sticky note obtained by reducing the sticky note 1132 or the like and allowing the contents to be included in the sticky note, a simple rectangle (rectangle which is smaller than the original sticky note 1132 or the like and with no real content), and a rectangle in which a color, a type of a frame line, or the like of the sticky note 1132 is reflected. Furthermore, a keyword (noun, verb or the like) may be extracted from inside the sticky note and be displayed in the reduced sticky note. In the keyword extraction, a keyword may be extracted by dividing the keyword into words or the like using morphological analysis or the like in natural language processing and using a dictionary which stores the keyword in advance. The structured sticky note display image 1146 is displayed in a case where there is a structured relationship between the sticky notes when pasting the sticky note.

Figure 11A:
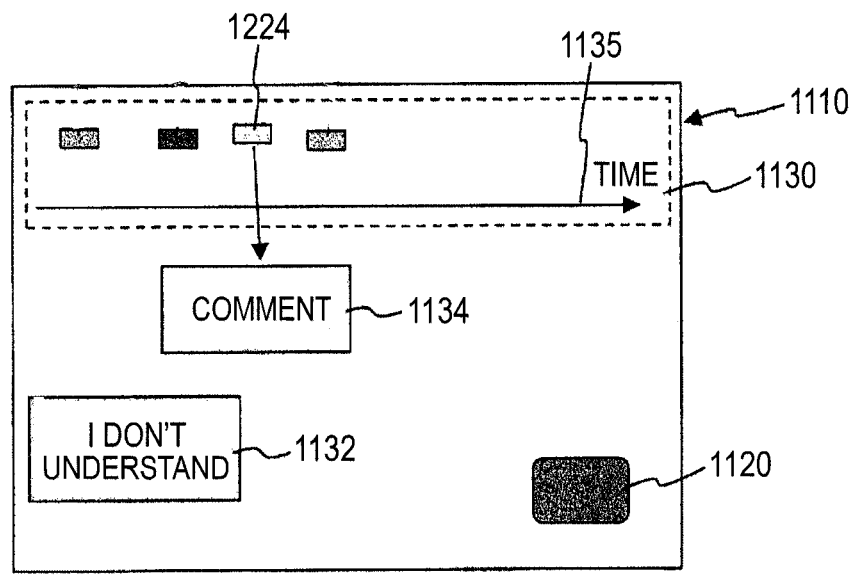
FIGS. 11A and 11B are explanatory diagrams illustrating an example of another processing performed by the exemplary embodiment.
Figure 11B:
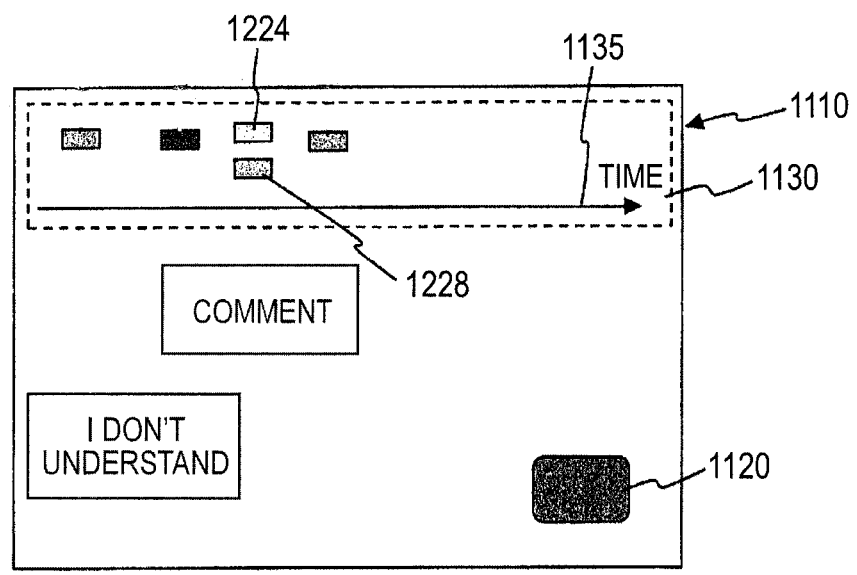

FIGS. 11A and 11B are explanatory diagrams illustrating an example of another processing performed by the exemplary embodiment.

An example of FIG. 11A illustrates a view where a video on which a sticky note is already pasted by another person. In a case where a reduced sticky note 1224 is pasted is placed in an elapsed time which is pasted, the original sticky note 1134 of the reduced sticky note 1224 is displayed. The position of the sticky note 1134 plays a position where the sticky note is pasted. The operation log table 700 may be used in the reproduction of the position where the sticky note is pasted. In this way, the sticky note which is already pasted may be displayed at the pasted elapsed time as the reproduction of the video is progressed. As illustrated in FIG. 11A, an arrow indicating a relationship between the sticky note 1134 being displayed on the video and the reduced sticky note 1224 within the time line area 1130, or the like may be displayed.

An example of FIG. 11B illustrates a view where a time has passed from a state illustrated in the example of FIG. 11A (since the display switching condition is satisfied), the sticky note 1132 is reduced and displayed within the time line area 1130. The sticky note 1132 and the sticky note 1134 on the video are erased.

The sticky note 1132 is pasted at the same time when the sticky note 1134 is pasted and thus, a reduced sticky note 1228 (reduced sticky note of the sticky note 1132) is placed at substantially the same position as that of the reduced sticky note 1224 (reduced sticky note of the sticky note 1134) on the time axis 1135.

Figure 12A:
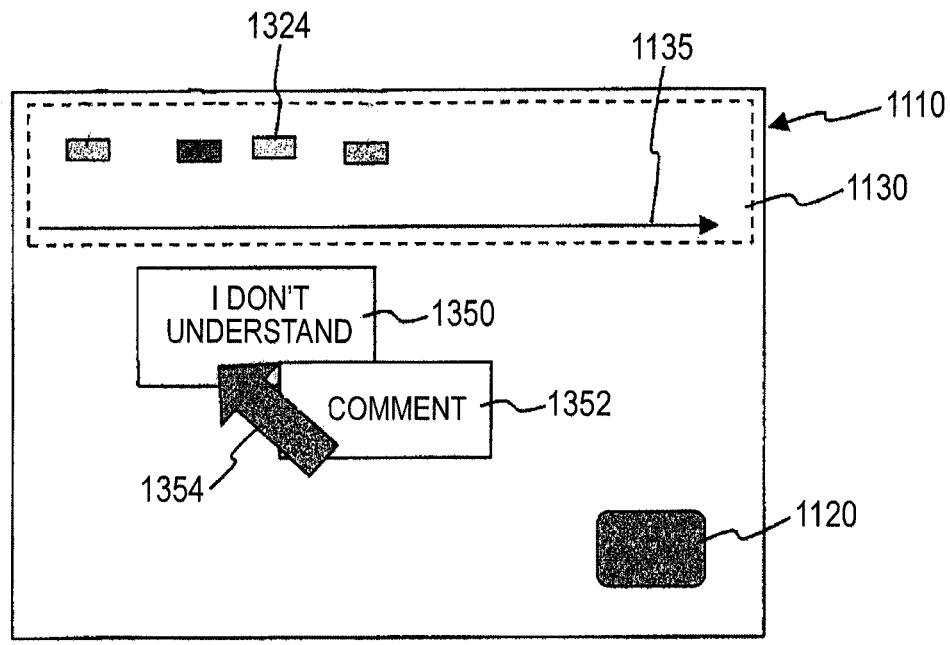
FIGS. 12A and 12B are explanatory diagrams illustrating an example of another processing performed by the exemplary embodiment.
Figure 12B:
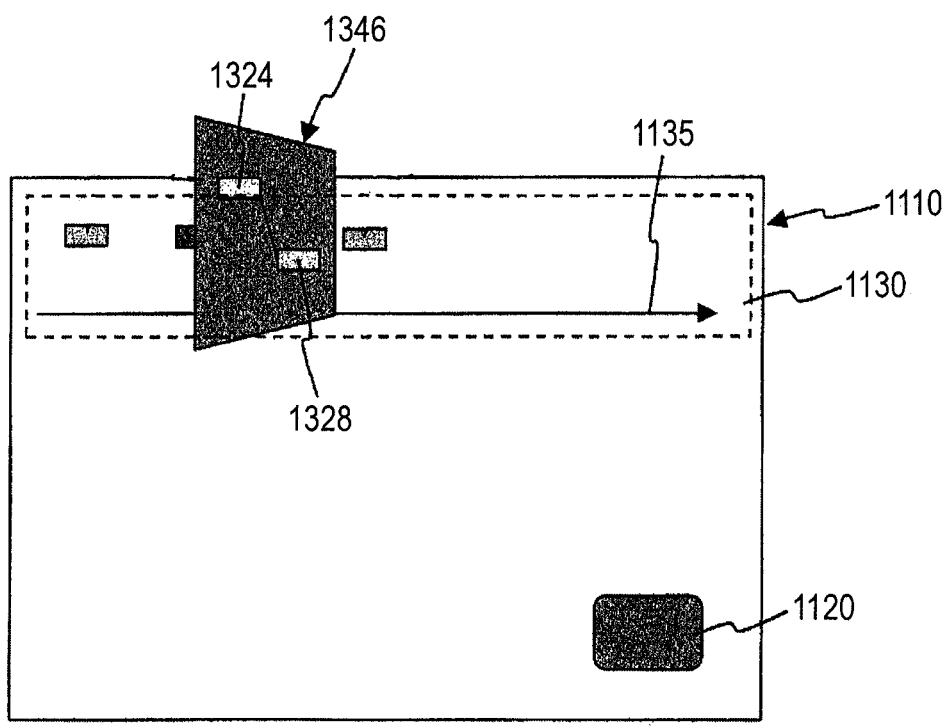

FIGS. 12A and 12B are explanatory diagrams illustrating an example of another processing performed by the exemplary embodiment.

An example of FIG. 12A illustrates a view where an association operation between a sticky note 1350 and a sticky note 1352 is performed. Specifically, the example of FIG. 12A illustrates a view where a connection line 1354 directing from the sticky note 1352 to the sticky note 1350 is designated by the operation of the user. For example, the example of FIG. 12A illustrates a tree structure in which the sticky note 1350 is used as a parent and the sticky note 1352 is used as a child. The structuralization is not limited to the tree structure and may include a network (net) structure.

An example of FIG. 12B illustrates a view where a time has passed from a state illustrated in the example of FIG. 12A (since the display switching condition is satisfied), a structured sticky note display image 1346, which indicating that association is made, is displayed within the time line area 1130. The sticky note 1350 and the sticky note 1352 on the video are erased.

Here, the entire frame of the structured sticky note display image 1346 is in a trapezoidal shape. That is, the structured sticky note display image 1346 on which the reduced sticky note 1324 and the reduced sticky note 1328 are pasted is made look like leant against the time axis 1135. That is, with respect to the time axis 1135, the structured sticky note display image 1346 is made look like existing in a direction oblique to a plane (screen) in which the time axis 1135 exists. Displaying as described above allows an association structure to be indicated without covering the screen. The figures of the reduced sticky note 1324 and the reduced sticky note 1328 may be subjected to an affine transformation to be deformed to become similar to the figure of the structured sticky note display image 1346. Displaying indicating a structure between the sticky note 1350 and the sticky note 1352 is performed in the structured sticky note display image 1346. Specifically, a connection line between the sticky notes is displayed. Furthermore, in a case of indicating a parent and child relationship, the positions of the sticky notes within the structured sticky note display image 1346 may be changed such that a sticky note serving as a parent is placed above and the other sticky note serving as a child is placed below.

The association between the sticky notes by the connection line may be performed on the reduced sticky note within the time line area 1130. In this case, the sticky note, which is pasted after the switching condition is satisfied, of the sticky notes subjected to the association occurs. However, displaying of a group of associated sticky notes on a single structured sticky note display image 1346 makes it easy to understand. The structured sticky note display image 1346 is displayed on the time axis of the position corresponding to the date and time at which the sticky note is pasted earliest of the group of the associated sticky notes.

Figure 13:
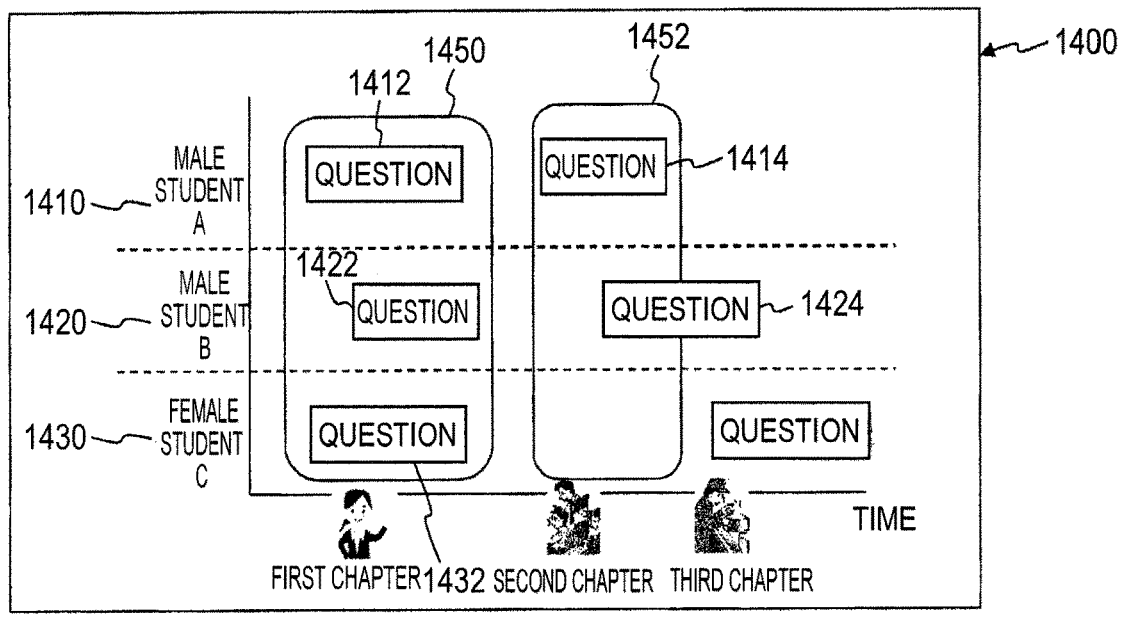
FIG. 13 is an explanatory diagram illustrating an example of another processing performed by the exemplary embodiment.

FIG. 13 is an explanatory diagram illustrating an example of another process performed by the exemplary embodiment.

The teacher's terminal 350 (or the personal terminal 150) displays a screen 1400 indicated in the example of FIG. 13. The swim lane chart prepared by the display information configuration module 105 is displayed in the screen 1400. In the swim lane chart, a sticky note is displayed on a position of the date and time at which the sticky note is pasted on the time axis for each user of the personal terminal 150. The time axis may be displayed in the chapter of the video instead of the elapsed time. The frame (for example, a frame line of the first chapter area 1450 or the like) may be rendered for each chapter.

In the example of FIG. 13, an area 1410 for a male student A, an area 1420 for a male student B, an area 1430 for a female student C of three students are displayed in a line. A first chapter area 1450 of a "first chapter" (chapter) illustrates that a sticky note (question) 1412, a sticky note (question) 1422, and a sticky note (question) 1432 are pasted. A second chapter area 1452 of a "second chapter" (chapter) illustrates that a sticky note (question) 1414 is pasted and a sticky note (question) 1424 is pasted on a time between the "second chapter" and the "third chapter". The user (teacher) of the teacher's terminal 350 becomes able to check pasting of the sticky note by each student for each chapter.

Figure 14:
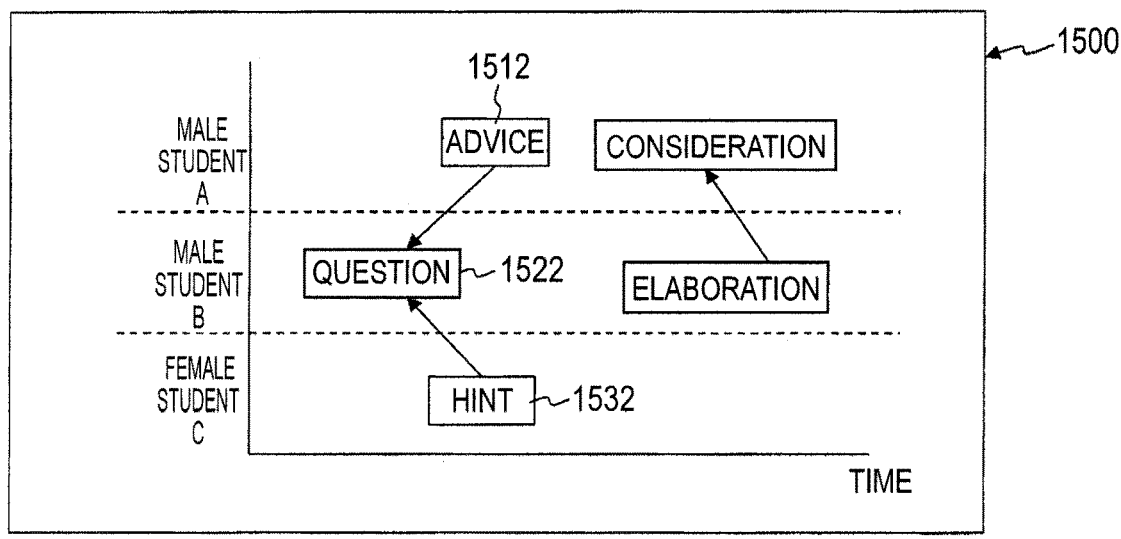
FIG. 14 is an explanatory diagram illustrating an example of another processing performed by the exemplary embodiment.

FIG. 14 is an explanatory diagram illustrating an example of another processing performed by the exemplary embodiment.

The teacher's terminal 350 (or the personal terminal 150) displays a screen 1500 illustrated in an example of FIG. 14. The swim lane chart prepared by the display information configuration module 105 is displayed in the screen 1500. Here, the sticky note to which the association in performed is mainly displayed in the swim lane chart. For example, it is recognized that a sticky note (advice) 1512 and a sticky note (hint) 1532 are pasted to a sticky note (question) 1522 as the parent, or the like and thus, it becomes able to determine the quality of making preparation, a relationship between the students, or the like.

Figure 15:
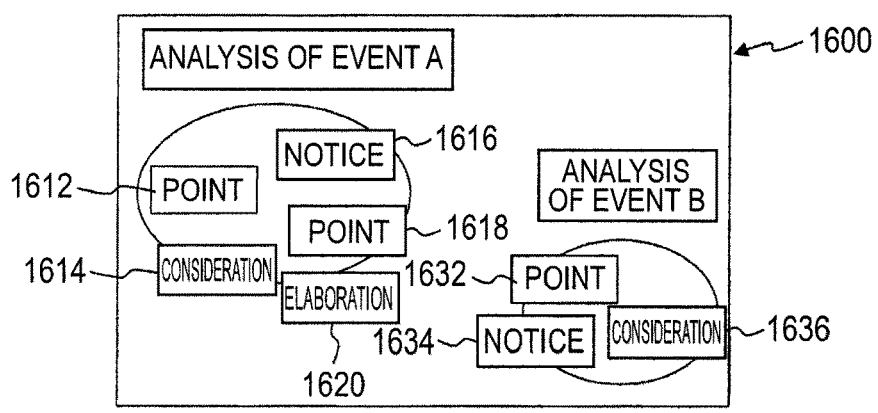
FIG. 15 is an explanatory diagram illustrating an example of another processing performed by the exemplary embodiment.

FIG. 15 is an explanatory diagram illustrating an example of another processing performed by the exemplary embodiment.

The teacher's terminal 350 (or the personal terminal 150) displays a screen 1600 illustrated in an example of FIG. 15. The content of the screen 1600 is prepared by the display information configuration module 105, the sticky note is pasted on a two dimensional mount, a discussion using the sticky note is allowed to be performed.

For example, the screen 1600 illustrates that a group of a sticky note (point) 1612, a sticky note (consideration) 1614, a sticky note (notice) 1616, a sticky note (point) 1618, and a sticky note (improvement) 1620 are prepared as an analysis of an event A and a group of a sticky note (point) 1632, a sticky note (notice) 1634, and a sticky note (consideration) 1636 are prepared as an analysis of an event B. For example, the prepared groups of sticky notes may be used in a class (discussion) by the group of the students.

Figure 16:
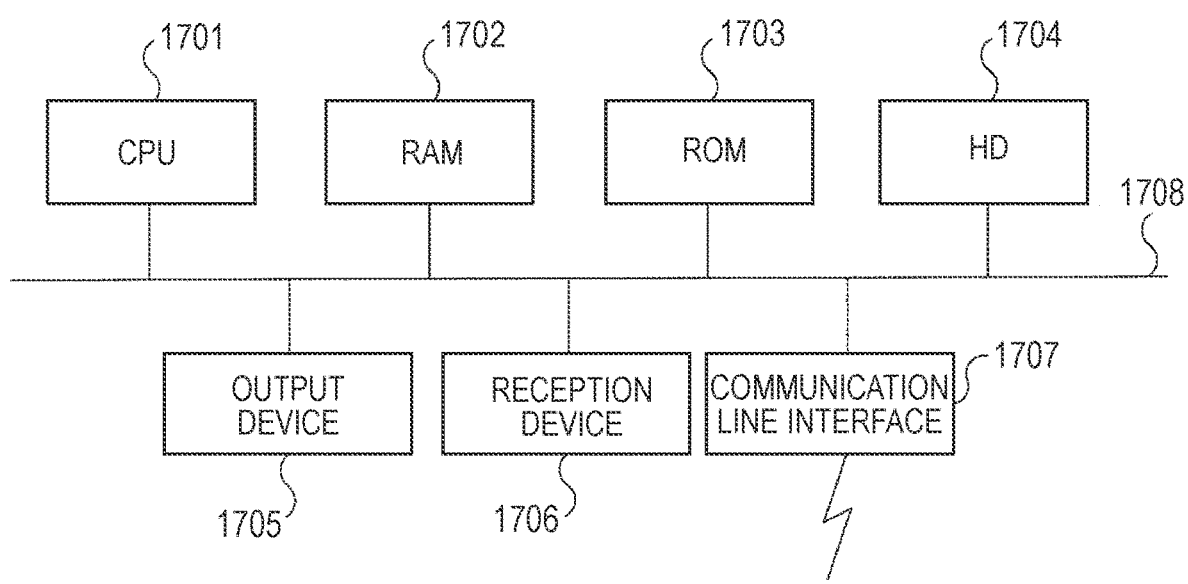
FIG. 16 is a block diagram illustrating an example of a hardware configuration of a computer that implements the exemplary embodiment.

A hardware configuration of a computer, which executes a program, as the present exemplary embodiment is a general computer, specifically, a personal computer or a computer capable of becoming a server, as illustrated in FIG. 16. That is, as a specific example, a CPU 1701 is used as a processing unit (operation unit), a RAM 1702, a ROM 1703, and an HD 1704 are used as a storage device. For example, a hard disk or a solid state drive (SSD) may be used as the HD 1704. The computer includes the CPU 1701 that executes programs such as the display information configuration module 105, the sticky note management module 110, a video processing module 115, the sticky note preparation and processing module 120, the display module 155, and the video and sticky note operation module 160, the RAM 1702 in which the program or data is stored, the ROM 1703 in which a program used for starting the computer of the present exemplary embodiment is stored, the HD 1704 which is an auxiliary storage device (which may be a flash memory or the like) having functions of the video information storage module 125, the sticky note information storage module 130, and the operation information storage module 135, a reception device 1706 that receives data based on the operation of a keyboard, a mouse, a touch screen, a microphone or the like by a user, an output device 1705 such as a CRT, a liquid crystal device, a speaker or the like, a communication line interface 1707 for connecting with a communication network interface card or the like, and a bus 1708 for connecting the components described above and used for exchanging data between the components. Plural computers each of which includes the components may be connected with each other through a network.

Regarding matters corresponding to the computer program of the exemplary embodiments described above, a computer program which is software is read into a system having a hardware configuration of the present exemplary embodiment, and software resources and hardware resources are cooperated with each other to implement the exemplary embodiment described above.

The hardware configuration of the information processing apparatus illustrated in FIG. 16 illustrates just one configuration example, the present exemplary embodiment is not limited to the configuration illustrated in FIG. 16, and may be a configuration in which the modules described in the present exemplary embodiment are adapted to be executable. For example, some of the modules may include exclusive hardware (for example, an application specific integrated circuit (ASIC) or the like), some of the modules may be adapted to be connected by the communication line placed within an external system. Furthermore, plural systems each of which is illustrated in FIG. 16 may be connected to each other by the communication line to be cooperated with each other. In particular, the system may be incorporated into a portable information communication device (including a mobile phone, a smart phone, a mobile device, a wearable computer or the like), home information appliances, a robot, a copy machine, a facsimile, a scanner, a printer, a multifunction machine (image processing apparatus equipped with functions of two or more of a scanner, a printer, a copy machine, a facsimile or the like), in addition to the personal computer.

The program described above may be provided in a state of being stored in a recording medium or be provided by a communication unit. In this case, for example, the program described above may be considered as an invention of a "computer readable recording medium having a program recorded therein".

The "non-transitory computer readable recording medium storing a program" refers to a non-transitory recording medium used for installation, execution, distribution or the like of the program, having recorded a program therein, and is readable by a computer.

The recording medium may include, for example, a digital versatile disk (DVD) such as "DVD-R, DVD-RW, DVD-RAM, or the like" that are standards formulated by the DVD forum, "DVD+R, DVD+RW, or the like" that are standards formulated by the DVD+RW, a compact disk (CD) such as a CD-read only memory (CD-ROM), a CD-recordable (CD-R), a CD-rewritable (CD-RW) or the like, a Blu-ray Disc, a magneto-optical disk (MO), a flexible disk (FD), a magnetic tape, a hard disk, a read-only memory (ROM), an electrically erasable programmable read-only memory (EEPROM (registered trademark)), a flash memory, a random access memory (RAM), a secure digital (SD) memory card, or the like.

A portion or the entirety of the program may be recorded in the recording medium to be saved or distributed. The portion or the entirety of the program may be transmitted, by communication, using a transmission medium such as a wired communication network, a wireless communication network, and a combination of the wired communication network and the wireless communication network, that are used, for example, in a local area network (LAN), a metropolitan area network (MAN), a wide area network (WAN), the Internet, the Ethernet, and an extra network, or may be carried by being superposed on a carrier wave.

Furthermore, the program may be a portion or the entirety of another program or may be recorded in the recording medium together with a separate program. The program may be divided to be recorded in plural recording media. The program may be recorded in any format such as a compressed format, an encrypted format, or the like as long as the program is able to be restorable.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a central processing unit configured to:
  play a video and paste a sticky note to the video;
  associate the sticky note with another pasted sticky note on the video in response to an operation of the user;
  display, on the video, a tree structure or a network structure of the associated sticky notes;
  remove the pasted sticky note from the video onto a time line area that is superimposed on the video in a case where a predetermined condition is satisfied;
  display the sticky note removed as a size reduced sticky note representation on a time axis within the time line area at a position indicating a date and time at which the sticky note was originally pasted to the video so that the date and time at which the sticky note removed was originally pasted to the video is indicated on the time axis so as to be checked; and
  in a case where the associated sticky notes are removed, display, on the time axis, an image of the tree structure or the network structure of the associated sticky notes.

2. The information processing apparatus according to claim 1,
wherein the predetermined condition is satisfied in a case where predetermined time elapses after the sticky note is pasted.

3. The information processing apparatus according to claim 1,
wherein the predetermined condition is satisfied in a case where a predetermined segment within the video is encountered after the sticky note is pasted.

4. The information processing apparatus according to claim 1,
wherein the predetermined condition is satisfied in a case where a number of sticky notes that is pasted is equal or greater than a predetermined number.

5. A non-transitory computer readable medium storing a program causing a computer to:
play a video and paste a sticky notes to the video;
associate the sticky note with another pasted sticky note on the video in response to an operation of the user;
display, on the video, a tree structure or a network structure of the associated sticky notes;
remove the sticky notes from the video onto a time line area that is superimposed on the video in a case where a predetermined condition is satisfied; and
display the removed sticky notes as a size reduced sticky note representation so as to be checked on a time axis within the time line area at a position indicating a date and time at which the sticky note was originally pasted on the video so that the date and time at which the sticky note removed was originally pasted to the video is indicated on the time axis so as to be checked; and
in a case where the associated sticky notes are removed, display, on the time axis, an image of the tree structure or the network structure of the associated sticky notes.

* * * * *